Jan. 31, 1933.    G. CARLSON    1,895,915
OUTLET BOX
Filed May 14, 1931
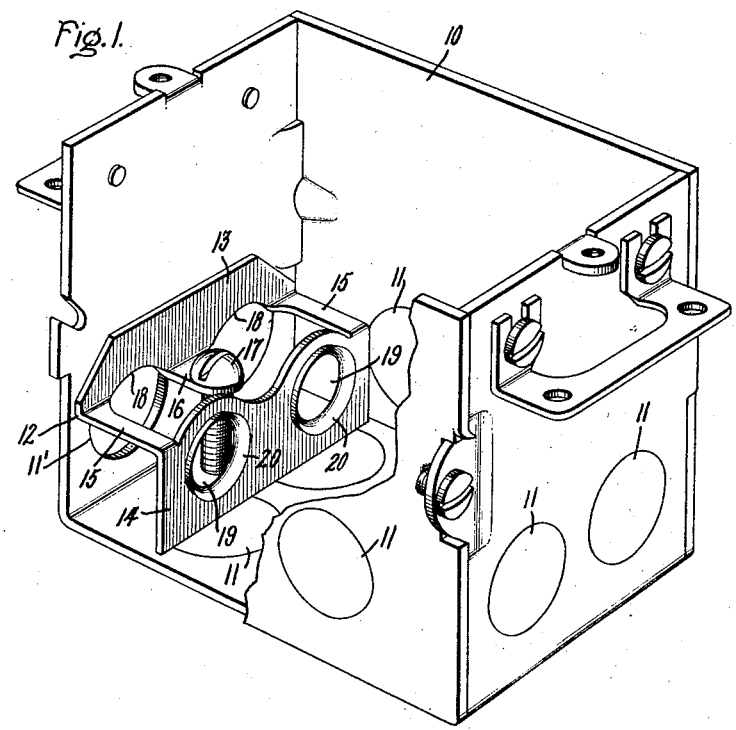
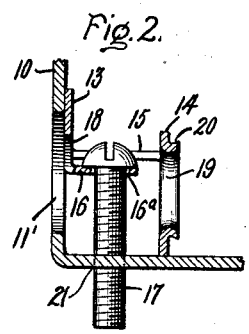
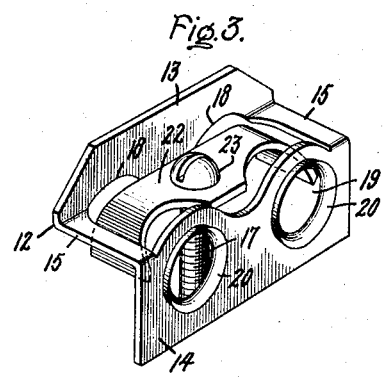
Inventor:
George Carlson,
by Charles E. Mullan
His Attorney.

Patented Jan. 31, 1933

1,895,915

UNITED STATES PATENT OFFICE

GEORGE CARLSON, OF BRIDGEPORT, CONNECTICUT, ASSIGNOR TO GENERAL ELECTRIC COMPANY, A CORPORATION OF NEW YORK

OUTLET BOX

Application filed May 14, 1931. Serial No. 537,404.

My invention relates to outlet boxes of the type provided with openings through which the end of an armored electric cable may be inserted and fastened in place by means of a clamp.

In connection with such boxes, it is required that the clamp should hold the cable firmly in position, and it is desirable that it should limit the distance which the cable can be drawn into the box. Also it is desirable that the clamp be simple in structure, easy to use and capable of being manufactured at low cost.

The object of my invention is to provide an improved clamp which meets the foregoing requirements in a satisfactory manner, and for a consideration of what I believe to be novel and my invention, attention is directed to the following specification and the claims appended thereto.

In the accompanying drawing, Fig. 1 shows, in perspective, an outlet box with a clamp in position, a portion of the side wall being broken away to expose the clamp; Fig. 2 shows a cross section of a portion of the receptacle and the clamp; and Fig. 3 shows a modified form of the clamp in perspective.

Referring to the drawing, 10 indicates an outlet box provided with the usual form of knockouts 11 whereby an opening may be provided at the point or points where it is desired to introduce the end of a cable into the box. One knockout is removed affording opening 11'. Ordinarily two knockouts are provided in each of the side and end walls of the box.

According to my invention, I provide a clamp 12 comprising a clamping portion 13, a portion 14 which is offset from and substantially parallel with the clamping portion and forms a wall for limiting the distance which a cable end can be drawn into the box, connecting straps 15 for joining portions 13 and 14 together, and an ear 16 provided with an opening for the reception of a screw 17 for fastening the clamp in position. Preferably all the parts are a single integral structure.

Clamping portion 13 comprises a plate having arcuate recesses 18 to engage the armor of the cable and clamp it in position. Ear 16 is shown as integrally connected to plate 13 and projecting at right angles therefrom between the recesses 18. It is provided with an opening $16^a$ of a diameter somewhat greater than the diameter of screw 17 so that the screw passes loosely through it. Portion 14 consists of a plate having circular openings 19 which are smaller in diameter than the armor of the cable but large enough to permit the insertion of the conductors and provide a stop with which the end of the armor engages to limit the distance the cable may be drawn into the box. Projecting from the openings 19 are collars 20 which are curved to provide bushings for the conductors which will not present a sharp edge that may cut into the conductor insulation and short circuit or ground the conductors. A threaded hole 21 is provided in the base of outlet box 10 for the insertion of screw 17 which holds the clamp 12 in the box and produces the clamping action. Connecting straps 15 are sufficiently flexible to permit clamping portion 13 to slide along the end wall of outlet box 10 in clamping the cable while portion 14 is in engagement with the base of outlet box 10. Clamp 12 may be used when it is only desired to clamp one cable though it is provided with means for clamping two cables at once. Obviously a clamp may be constructed in accordance with my invention that will provide clamping means for more than two cables. Provision may be made in the outlet box for the use of two or more clamps in conjunction with the other knockouts in the walls and base of the box merely by drilling holes and tapping them to receive screw 17.

To connect conductors in box 10 a portion of the armor is first removed from the end of the cable which is to be connected in the box. One of the knockouts is then removed. One or more clamps will be furnished with each box and placed in position at one or both ends of the box. If it is desired to insert the conductor in an end of the box provided with a clamp in position it will not be necessary to move the clamp unless it blocks too large a portion of the opening to permit the insertion of the cable, in which case it will only be necessary to loosen the screw. If the clamp is not in the desired position then the clamp may be easily moved to the proper location by removing the screw, placing the clamp in the proper place, and inserting the screw in the corresponding hole and screwing it in sufficiently to hold the clamp in position. The cable may then be inserted in the box and through the corresponding opening in the clamp. The cable is then pulled into the box until the armor contacts with the stop plate 14 of the clamp. The cable is then clamped in position by tightening the screw 17 until plate 13 closes a portion of the opening in the box and contacts with the armor holding it in position between the bottom edge of the knockout opening 11' and recesses 18 in the plate 13. Opening 16ª being larger in diameter than screw 17, permits the clamp 12 to adjust itself to the position it must occupy in clamping the cable. The clamp may assume, in some instances, a somewhat angular position relatively to the adjacent box wall.

In Fig. 2 clamp 12 is shown in the normal position which it assumes when screw 17 is tightened to clamp the cable and hold the conductors in position. In the normal position when no conduit is being clamped screw 17 will not be threaded so far into hole 21 to obstruct the opening 11' in the box and so will permit the ready insertion of the cable.

In Fig. 3 I have shown a modification of my clamp in which an additional clamping surface is provided for the cable. The clamping surface is provided by an auxiliary clamp 22 comprising a strip of metal having arcuate depending sides to partially surround and engage the cable. An aperture 23 is provided in auxiliary clamp 22 to permit the insertion of screw 17 which holds clamp 22 in proper position to coact with clamp 12.

My clamp provides improved means for clamping cable and positioning the conductors within the outlet box. The clamp is of very low cost of manufacture because it may be stamped out from one piece of metal. The collars 20 may then be pressed out to form the bushings and the plates 13 and 14 and ear 16 bent to their proper relative positions. The assembly of the clamp within the box is a very simple and inexpensive operation because it merely requires the positioning of the clamp and insertion of the screw in the threaded hole in the box. The use of the clamp to perform its function in the box is so simple that one inexperienced in the use of such devices may readily use the clamp with a saving of time and labor in the performance of the operation of inserting and clamping the cable. In addition, the stop plate 14 provides a means to prevent the drawing of too much cable within the box and so insures there being ample room for the devices to be located within the box.

What I claim as new and desire to secure by Letters Patent of the United States is:

1. An outlet box having openings in one of its walls to receive armored conductors and a threaded opening in the bottom adjacent to said wall, and means to clamp the armored conductors entering the box through said openings in the wall comprising a unitary structure with a plate slidably engaging said wall and having arcuate recesses to engage the tops of the armored conductors, another plate parallel to said first mentioned plate and having circular openings in line with the openings in said wall to form bushings for the conductors, straps connecting said plates, an apertured ear connected to the first mentioned plate, and a screw passing through said ear and threaded in the opening in the base of the outlet box to move the first mentioned plate along the wall and relative to the second plate to clamp the armored conductors in the openings in the wall.

2. An outlet box having openings in one of its walls to receive armored conductors and a threaded opening in the base adjacent to said wall, means for clamping the armored conductors passing through the openings in the wall comprising a plate slidably engaging said wall and having arcuate recesses to engage the tops of the armored conductors, another plate parallel to said first mentioned plate and having circular openings in line with the openings in said wall to form bushings for the conductors and stops for the armor, straps connecting said plates for permitting relative movement, an apertured ear connected to the first mentioned plate, and a screw passing through said ear and threaded in the opening in the base of the outlet box to move the first mentioned plate along the wall relative to the second plate to clamp the armored conductors in the openings in the wall.

3. An outlet box having openings in one of its walls to receive armored conductors and a threaded opening in the base adjacent said wall and means for clamping the armored conductors passing through said openings comprising a plate slidably engaging said wall and having arcuate recesses to engage the tops of the armored conductors, another plate having circular openings in line with the openings in said wall to form bushings for the conductors, straps connecting said plates but permitting relative movement, an apertured ear connected to the first mentioned plate, an auxiliary clamp with an aperture registering with the aperture in said ear and having depending arcuate sides to clamp the armored conductors, and a screw passing through said apertures and threaded in the opening of the base of the outlet box to move the first mentioned plate and auxiliary clamp relative to the second plate to clamp the armored conductors in the openings in the wall.

In witness whereof I have hereunto set my hand.

GEORGE CARLSON.